April 27, 1948. S. B. PICKLES 2,440,290
HIGH FREQUENCY CABLE AND METHOD OF BALANCING THE SAME
Filed Jan. 8, 1944
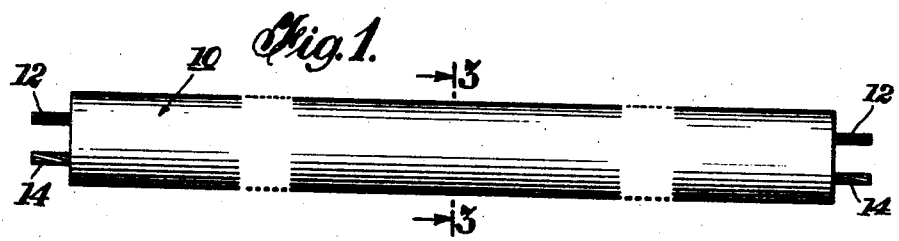
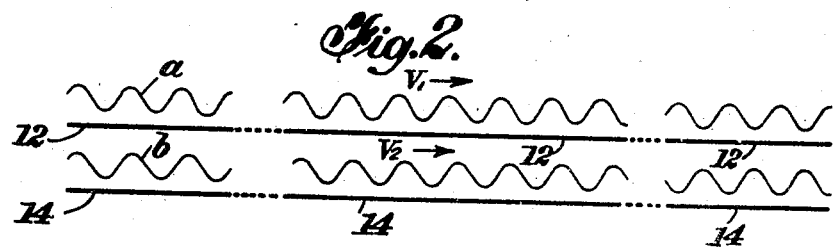
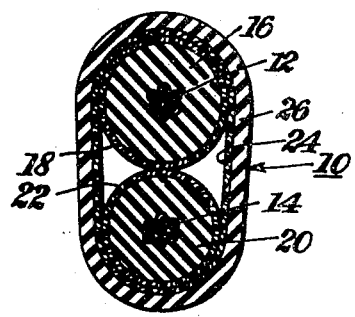
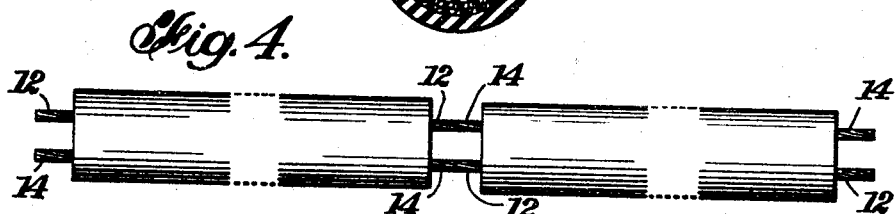
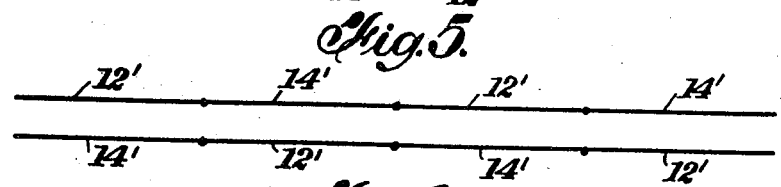
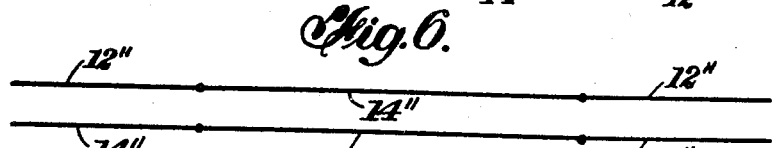
INVENTOR.
SIDNEY B. PICKLES
BY
ATTORNEY Patented Apr. 27, 1948

2,440,290

UNITED STATES PATENT OFFICE 2,440,290

HIGH-FREQUENCY CABLE AND METHOD OF BALANCING THE SAME

Sidney B. Pickles, Jackson Heights, N. Y., assignor to Federal Telephone and Radio Corporation, New York, N. Y., a corporation of Delaware Application January 8, 1944, Serial No. 517,490

5 Claims. (Cl. 174—34)

This invention relates to improvements in high frequency cables and methods of balancing the same, and more particularly to a method for balancing dual, concentric, solid dielectric cables of relatively long electrical length.

It is frequently necessary, particularly for radio apparatus used in the field, to utilize long cables to interconnect various pieces of the apparatus. In many instances these cables are in the form of dual concentric cables, and are required to carry currents of extremely high frequencies. Under such circumstances their electrical properties may be quite critical.

In the manufacture of such dual cables, it is common practice to form individual single, solid dielectric concentric cables and then enclose the two cables in a common shield surrounded by a protecting, insulating coating. While the electrical characteristics of the individual cables can be relatively closely controlled, for example, the surge impedance of the two cables will probably match quite closely, it is difficult to form each cable with the same thickness of surrounding insulation. While the thickness of this insulation can be held within certain limits, it often varies sufficiently between two otherwise identical cables to change the velocity propagation constant between the two to such an amount that for a long cable a phase shift of up to 180° between the two cables may result. For example, even if the velocity propagation constants are relatively equal say, .635 for one concentric line and .650 for the other line, if the cable is one thousand electrical degrees in length, this will produce a phase shift at the ends of the lines of 17°.

It is the primary object of the present invention to provide a method and a resultant dual cable by means of which this unbalanced condition is removed and a substantially balanced dual line suitable for use at high frequencies is produced.

I attain these objects by the construction shown in the annexed drawings wherein:

Fig. 1 is a longitudinal elevation of an ordinary dual cable;

Fig. 2 illustrates graphically the phase shift between the two concentric lines of such a cable if they have different velocity propagation constants;

Fig. 3 is a transverse cross-sectional view taken along the line 3—3 of Fig. 1;

Fig. 4 is a longitudinal elevation of a balanced dual cable, in accordance with the present invention;

Fig. 5 illustrates diagrammatically other methods of balancing an unbalanced dual cable; and Fig. 6 illustrates a further method for effecting the desired balance.

As shown in Fig. 1, the ordinary dual cable 10 will have two main conductors 12 and 14. These conductors, as more clearly shown in Fig. 3, are generally surrounded by suitable insulation 16 and 20 which, in turn, is surrounded by a sheath in the form of copper braid 18 and 22 respectively. The two cables will be covered by a second common copper braid 24 surrounded by suitable insulating material 26. In Fig. 3 I have illustrated, by way of example, two concentric lines forming the dual cable, which are surrounded by insulation of different thickness. The difference in thickness has been shown on an exaggerated scale for the sake of clarity in the drawings, but any difference in thickness between the inner conductor and outer conductor in the form of the copper braid, will produce a difference in the velocity propagation constants between the two lines. In Fig. 2, for example, if the line 12 has a velocity propagation constant $v_1$ the velocity wave $a$ may travel along the line in the manner indicated. However, if the line 14 has a velocity propagation constant $v_2$ the resultant velocity wave $b$ may, at the end of the line be 180° out of phase with the wave $a$ in the line 12. It is obvious, of course, that such a phase shift at the end of the line is wholly undesirable, and in many instances, makes the cable wholly unfit for use.

In accordance with the present invention I have found that if the dual cable is broken into a number of parts with the center conductors of adjacent parts reversed, the difference in velocity propagation constant will be more or less automatically balanced out and a cable otherwise unfit for use can be now used. In Fig. 4, for example, it will be noted that the cable 10 has been cut in half with the second half reversed with respect to the first half. In other words, the conductor 12 of the first half of the cable is connected to the conductor 14 of the second half of the cable, and vice versa. By means of this reversed connection, phase shifts of 40° at the end of a line have been reduced to 5°, or within a useful range.

If greater balance in the dual cable is desired, for example if the velocity propagation constant varies along each concentric line, as well as being different between the two lines, more reversals may be effected. For example, in Fig. 5 I have indicated the cable as being divided into four parts with three reversals between conductors 12' and 14' taking place. If the cable is divided into an unequal number of parts, as shown in Fig. 6, the total length of the reversed cable parts should equal the length of the unreversed cable parts. In other words, the reversed portion of conductor 12'' is equal to the unreversed portions thereof, the same being true of conductor 14''.

While the same has not been illustrated, it will be understood by those skilled in this art that the joints made in this cable to effect the desired reversal between adjacent cable parts can be covered by insulation, or a suitable junction box of a design which will not affect the inherent electrical characteristics of the dual line.

Having thus indicated the nature of the invention and having specifically described a preferred method of effecting the same, I claim as new, and desire to secure by Letters Patent the invention as defined in the following claims.

I claim:

1. The method of balancing a high frequency, solid dielectric, dual, concentric cable, of predetermined length, in which each individual concentric line has a different velocity propagation constant, which includes the steps of cutting the cable into a plurality of parts and reconnecting these cable parts with adjacent parts reversed, so that the one concentric line of one part is connected to the other concentric line of its adjacent part and vice versa, the total length of reversed cable parts being equal to the total length of the cable parts not reversed.

2. The method of balancing a high frequency, solid dielectric, dual, concentric cable, of predetermined length, in which each individual concentric line has a different velocity propagation constant, which includes the steps of cutting the cable into an equal number of parts of equal length and reconnecting the cable parts with adjacent parts reversed, so that the one concentric line of one part is connected to the other concentric line of its adjacent part and vice versa.

3. A balanced, dual, coaxial high frequency line, comprising a solid dielectric dual, concentric cable whose individual concentric lines each have a different velocity propagation constant, said cable being separated into a plurality of parts reconnected with adjacent parts reversed, so that the one concentric line of one part is connected to the other concentric line of its adjacent part and vice versa, the total length of reversed cable parts being equal to the total length of the cable parts not reversed.

4. A balanced, dual, coaxial high frequency line, comprising a solid dielectric dual, concentric cable whose concentric lines each have a different velocity propagation constant, said cable being divided into an even number of parts of equal length reconnected with adjacent parts reversed, so that the one concentric line of one part is connected to the other concentric line of its adjacent part and vice versa.

5. The method of balancing a high frequency solid dielectric dual line cable of predetermined length in which each individual line has a different velocity propagation constant, which includes the steps of cutting the cable into a plurality of parts and reconnecting these cable parts with adjacent parts reversed so that one line of one part is connected to the other line of its adjacent part and vice versa, the total length of reversed cable parts being equal to the total length of the cable parts not reversed.

SIDNEY B. PICKLES.

REFERENCES CITED

The following references are of record in the file of this patent:

UNITED STATES PATENTS

| Number | Name | Date |
|---|---|---|
| 276,757 | Bentley | May 1, 1883 |
| 1,922,138 | Nyquist | Aug. 15, 1933 |

FOREIGN PATENTS

| Number | Country | Date |
|---|---|---|
| 446,645 | Great Britain | 1936 |